(12) United States Patent
Iyer et al.

(10) Patent No.: US 7,151,776 B1
(45) Date of Patent: Dec. 19, 2006

(54) SYSTEM AND METHOD FOR PROVIDING QUALITY OF SERVICE TRANSPORT AT AN AIR INTERFACE OF A TELECOMMUNICATIONS NETWORK

(75) Inventors: Jayaraman Ramaswamy Iyer, Sunnyvale, CA (US); Malcolm M. Smith, Calgary (CA)

(73) Assignee: Cisco Technology, Inc., San Jose, CA (US)

( * ) Notice: Subject to any disclaimer, the term of this patent is extended or adjusted under 35 U.S.C. 154(b) by 930 days.

(21) Appl. No.: 10/086,916

(22) Filed: Feb. 28, 2002

(51) Int. Cl.
*H04L 12/28* (2006.01)
*H04L 12/56* (2006.01)
*H04L 12/66* (2006.01)
*H04L 29/06* (2006.01)
*H04L 29/08* (2006.01)
*H04B 7/216* (2006.01)
*H04B 7/212* (2006.01)

(52) U.S. Cl. ............... 370/401; 370/335; 370/337; 370/352; 455/414

(58) Field of Classification Search ............... 370/401, 370/337, 535, 347, 466, 539, 236, 395, 349, 370/335, 441, 329, 252, 342, 468; 455/452.2, 455/450, 452, 451, 456, 414, 422, 435, 412.1; 709/226, 233, 249
See application file for complete search history.

(56) References Cited

U.S. PATENT DOCUMENTS

| | | | |
|---|---|---|---|
| 5,912,885 A | 6/1999 | Mitts et al. | |
| 6,487,595 B1 * | 11/2002 | Turunen et al. | 709/226 |
| 6,731,623 B1 * | 5/2004 | Lee et al. | 370/349 |
| 6,775,268 B1 * | 8/2004 | Wang et al. | 370/352 |
| 6,829,254 B1 * | 12/2004 | Rajahalme et al. | 370/535 |
| 6,957,071 B1 * | 10/2005 | Holur et al. | 455/452.2 |
| 2001/0046200 A1 * | 11/2001 | Koo et al. | 370/335 |
| 2003/0002465 A1 * | 1/2003 | Glendining et al. | 370/337 |

(Continued)

FOREIGN PATENT DOCUMENTS

EP    0 991 218 A2    4/2000

(Continued)

OTHER PUBLICATIONS

Jo, K.Y.; Modelfino, T.; Satellite communications networks with IP quality of services, Military Communications Conference, 2003. MILCOM 2003. IEEE, vol. 1, Oct. 13-16, 2003 pp. 267-267 vol. 1.*

(Continued)

*Primary Examiner*—Chi Pham
*Assistant Examiner*—Prenell Jones
(74) *Attorney, Agent, or Firm*—Baker Botts L.L.P.

(57) ABSTRACT

A telecommunications network includes a mobile station that generates wireless telecommunications traffic in radio frames for transmission to a base transceiver station. The mobile station sets a TFCI field in the radio frame to provide a class of service indication for the payload information carried in the radio frame. The TFCI field is set according to a priority of the payload information to be carried in the radio frame. The base transceiver station receives the wireless telecommunications traffic and identifies the class of service indications carried in the radio frame. The base transceiver station encapsulates the radio frame into Internet Protocol packets. The base transceiver station maps the transport format combination indicator field into a differentiated services code point field in header information of the Internet Protocol packets. The base transceiver station forwards the Internet Protocol packets to a base station controller over an Internet Protocol network according to the identified class of service indication in the differentiated services code point field.

23 Claims, 1 Drawing Sheet

U.S. PATENT DOCUMENTS

2003/0129971 A1* 7/2003 Gopikanth .............. 455/414
2003/0134648 A1* 7/2003 Reed et al. ............... 455/456
2003/0198207 A1* 10/2003 Lee et al. ................. 370/337

FOREIGN PATENT DOCUMENTS

| EP | 1 035 676 A1 | 9/2000 |
| EP | 1 079 642 A1 | 2/2001 |
| EP | 1 096 743 A1 | 5/2001 |
| EP | 1 098 542 A2 | 5/2001 |
| EP | 1 150 523 A2 | 10/2001 |
| WO | WO 00/51380 | 8/2000 |
| WO | WO 01/33885 A1 | 5/2001 |
| WO | WO 01/65873 A1 | 9/2001 |
| WO | WO 02/15409 A1 | 2/2002 |

OTHER PUBLICATIONS

Bostic, J.; Drcic, U; Mohorcic, M.; Kandus, G.; Delivering IP with QoS/CoS over HeliNet, Personal, Indoor and Mobile Radio Communications, 2002. The 13th IEEE International Symposium on, vol. 4 Sep. 15-18, 2002 pp. 1591-1595 vol. 4.*

* cited by examiner

SYSTEM AND METHOD FOR PROVIDING QUALITY OF SERVICE TRANSPORT AT AN AIR INTERFACE OF A TELECOMMUNICATIONS NETWORK

TECHNICAL FIELD OF THE INVENTION

The present invention relates in general to wireless telecommunications technology and more particularly to a system and method for providing quality of service transport at an air interface of a telecommunications network.

BACKGROUND OF THE INVENTION

Wireless and cellular networks are evolving into a model that implements the Internet Protocol. However, network architectures do not provide a wireless infrastructure that can support the Internet Protocol in a seamless manner. Wireless traffic originating from a mobile station is not terminated by a receiving base transceiver station. Though the radio access network infrastructure can support the Internet Protocol as a transport medium, there is no knowledge concerning user applications being carried in the wireless traffic without this termination at the base transceiver station. Such lack of knowledge is detrimental to the quality of service for the user traffic and hampers the ability to provision a transport path through the network. Conventional approaches to overcome this scenario include providing out of band information associated with the traffic. The use of out of band information requires very tight coupling between the radio resource management and the usage of communication channels as well as dynamically associating the quality of service information carried out of band with each channel. This approach is not very scalable and may break the quality of service associated with the supported applications. Another approach merely provides for a constant default setting of traffic priority. Therefore, it is desirable to provide a simple technique to perform Internet Protocol quality of service over an air interface.

SUMMARY OF THE INVENTION

From the foregoing, it may be appreciated by those skilled in the art that a need has arisen for a technique to account for quality of service of traffic at the air interface in a wireless network. In accordance with the present invention, a system and method for providing quality of service transport at an air interface of a telecommunications network are provided that substantially eliminate or greatly reduce disadvantages and problems associated with conventional quality of service approaches.

According to an embodiment of the present invention, there is provided a system for providing quality of service transport at an air interface of a telecommunications network that includes a mobile station to provide and receive wireless telecommunications traffic. A base transceiver station establishes a communication session with the mobile station. The mobile station inserts a class of service indication in the wireless telecommunications traffic provided to the base transceiver station. The base transceiver station maps the wireless telecommunications traffic to routing channels according to the class of service indication for transport through a wired portion of the telecommunications network.

The present invention provides various technical advantages over conventional quality of service approaches. For example, one technical advantage is to provide a class of service indication at a base transceiver station in an air interface of a telecommunications network. Another technical advantage is to implement an all Internet Protocol distributed system with loose coupling between the Internet Protocol and the radio layers. Yet another technical advantage is to provide ease of Internet Protocol transport in a radio access network. Other examples may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
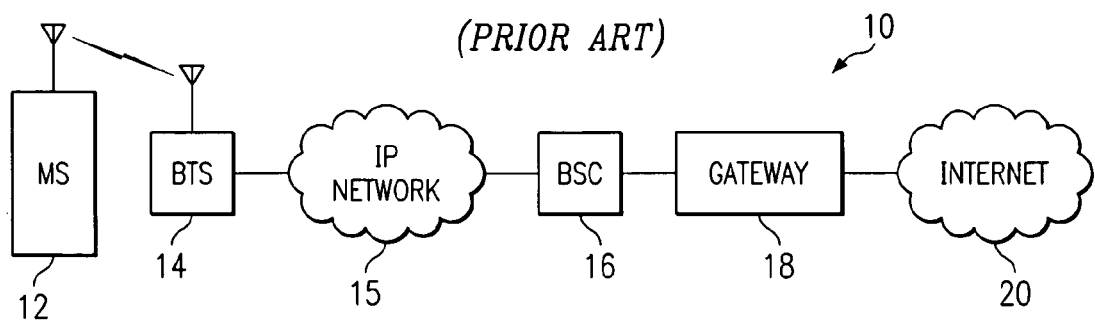
FIG. 1 illustrates a block diagram of a telecommunications network.

FIG. 1 is a block diagram of an exemplary telecommunications network 10. Telecommunications network 10 includes a mobile station 12, a base transceiver station 14, an Internet Protocol (IP) network 15, a base station controller 16, a gateway node 18, and an Internet network 20. Telecommunications network 10 may also include other conventional components as desired.

In operation, mobile station 12 initiates a communication session with base transceiver station 14. Base transceiver station 14 establishes the communications session with mobile station 12. Mobile station 12 provides wireless telecommunications traffic, which may include voice, data, and/or control information, to base transceiver station 14. Base transceiver station 14 receives the wireless telecommunications traffic and processes the information request for appropriate forwarding to base station controller 16 over IP network 15. Base station controller 16 processes the information request and forwards it on to gateway node 18 for distribution to an appropriate entity on Internet network 20.

In response to the information in the wireless communications traffic, gateway node 18 may receive an information response from the appropriate entity on Internet network 20. The information response is provided to base station controller 16 for processing and routing to base transceiver station 14 over IP network 15. Base transceiver station 14 places the information response into wireless telecommunications traffic for delivery to mobile station 12. Though not shown, there may be other intermediate elements within telecommunications network 10 that perform processing and passing of the wireless telecommunications traffic and the information therein.

The combination of mobile station 12 and base transceiver station 14 provides an air interface within telecommunications network 10. The remainder of telecommunications network 10 preferably uses physical wire or fiber optic links, though other wireless interfaces may also be incorporated herein.

Wireless telecommunications traffic transmitted by mobile station 12 is in a radio frame that is received by base transceiver station 14. The radio frame includes a field that can be used by mobile station 12 to set a class of service for the wireless telecommunications traffic so that the information request can be routed over an appropriate channel through telecommunications network 10. Mobile station 12 sets a transport format combination indicator (TFCI) field that maps into a differentiated services code point (DSCP) per hop behavior in order to provide class of service information. Examples of DSCP class of service per hop behaviors include expedited forwarding, assured forwarding, and best efforts forwarding. Two bits of the TFCI field may be used to identify the class of service for the particularly Internet Protocol packet, though other bit identification schemes may be used involving a longer bit string. The TFCI field identifies the transport format used by each transport channel within the radio frame of the air interface. The multiplexing and exact rate matching patterns follow pre-defined rules and are encoded in the TFCI field by mobile station 12.

Base transceiver station 14 derives the class of service information from the TFCI field upon receipt of the wireless telecommunications traffic without other explicit signaling over the air interface of telecommunications network 10. An example mapping of bits 0 and 1 of the TFCI to a per hop behavior may be as follows: 11—class 1 expedited forwarding, 10—class 2 assured forwarding, 01—class 3 assured forwarding, and 00—best efforts forwarding. From the class of service identified in the TFCI field of the radio frame from mobile station 12, base transceiver station 14 can encapsulate the radio frame into IP packets and forward the IP packets to base station controller 16 over IP network 15 according to the specified class of service. Base transceiver station 14 maps the TFCI field directly into a DSCP field in the IP headers of the IP packets to facilitate class of service forwarding to base station controller 16.

Figure 2:
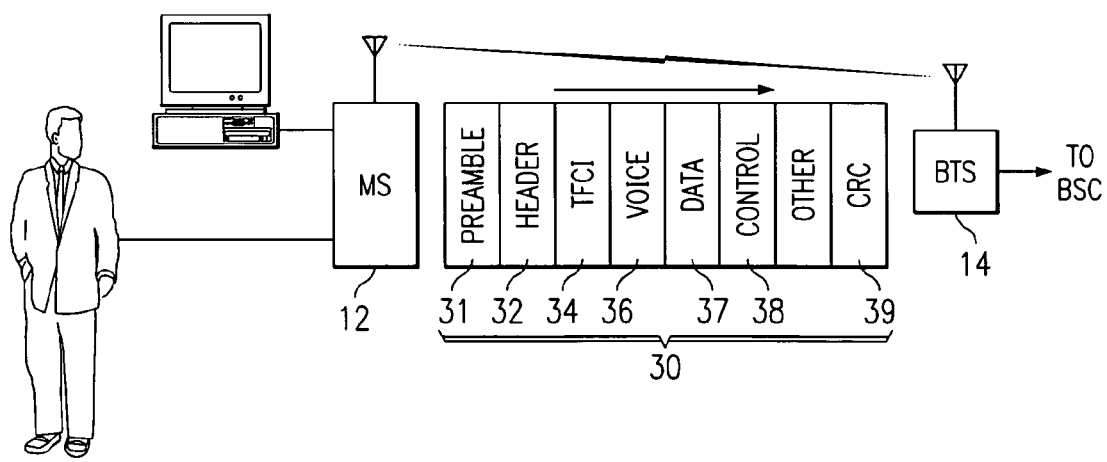
FIG. 2 illustrates an air interface of the telecommunications network.

FIG. 2 shows the air interface of telecommunications network 10. In an upstream operation, mobile station 12 transmits the wireless telecommunications traffic in one or more radio frames 30 to base transceiver station 14. Each radio frame 30 may include a preamble 31, a header 32, a TFCI field 34, a voice payload 36, a data payload 37, a control payload 38, and a cyclic redundancy check field 39. Each radio frame 30 may include other fields as desired or fewer fields depending on the desired transmission. Mobile station 12 sets the TFCI field according to the type of payload carried by radio frame 30. Mobile station 12 determines the priority of the payload to be carried by radio frame 30. For example, a voice payload may have mobile station 12 set the TFCI field to show an expedited forwarding class of service. A data payload may have mobile station 12 set the TFCI field to show a best efforts forwarding class of service. For multiple payloads of the same or different type of information, mobile station 12 may be configured to set the TFCI field according to the payload with the highest priority.

Upon receiving the wireless telecommunications traffic from mobile station 12, base transceiver station performs channel coding, forward error correction coding, and other conventional processing on the wireless telecommunications traffic. If a radio frame passes this processing without error, then there has been a good indication that the radio frame was received intact and without error. To increase confidence that a valid radio frame has been received, base transceiver station 14 may also perform a cyclic redundancy check on the radio frame. The cyclic redundancy check is normally performed at base station controller 16 to accept and reject IP packets. Performance of a cyclic redundancy check at base transceiver station 14 determines if the content of a radio frame is suitable for interpreting the information carried therein. If not, then the radio frame is discarded.

If content of the radio frame can be interpreted, base transceiver station 14 encapsulates the radio frame into one or more IP packets. Base transceiver station 14 extracts the TFCI field and the class of service indication identified therein. The TFCI field is in a fixed position of each radio frame and thus can be readily identified by base transceiver station 14. Upon determining the class of service from the TFCI field, base transceiver station 14 maps the class of service information into the DSCP field of the IP header in each IP packet. Base station transceiver 14 then forwards the IP packets to base station controller 16 over IP network 15 according to the identified class of service in the DSCP field.

Class of service forwarding may also be applied in the downstream direction from base transceiver station 14 to mobile station 12. For downstream operation, base station controller 16 provides IP packets carrying radio frame information to base transceiver station 14. The DSCP field in the IP headers of the IP packets indicate the class of service to be applied for forwarding the IP packets to base transceiver station 14 through IP network 15. Base transceiver station 14 also uses the DSCP field in the IP headers of the IP packets received from IP network 15 and base station controller 16 for class of service forwarding over the wireless link to mobile station 12. Base transceiver station 14 converts the IP packets into one or more radio frames for transmission to mobile station 12 according to the class of service indicated by the DSCP field. Base transceiver station 14 may map the DSCP field in the IP headers of the IP packets into the TFCI field of the radio frame in order to provide mobile station 12 with an indication of the class of service associated with the radio frame received from base transceiver station 14. Thus, base transceiver station 14 can perform scheduling and classification of radio frame information to be transmitted to mobile station 12.

Base station controller 16 can use the TFCI field for mapping radio traffic to routing channels indicated by the DSCP class of service forwarding values. This would apply to traffic going to and from gateway node 18. Gateway node 18 may be any type of node providing services, including a packet data serving node (PDSN), a serving general packet radio service support node (SGSN), and a gateway general packet radio service support node (GGSN). Thus, the present invention can be implemented in code division multiple access (CDMA) systems as well as wideband code division multiple access (WCDMA)/universal mobile telecommunications system (UMTS) networks.

In this manner, an all IP distributed system can be built that provides loose coupling and de-coupling between the IP and radio layers and allow a true IP infrastructure to grow. All nodes in telecommunications network 10 will now know the class of service for all traffic flowing therein. Every radio frame will have an associated class of service encoding that is mapped directly into a DSCP. No changes are needed in the header of the radio frame which greatly simplifies the complexities at base transceiver station 14 in terms of mapping channels to certain quality of service classes.

Thus, it is apparent that there has been provided, in accordance with the present invention, a system and method for providing quality of service transport at an air interface of a telecommunications network that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A system for providing quality of service transport in a wireless telecommunications network, comprising:

a mobile station operable to provide wireless telecommunications traffic, the mobile station operable to set a class of service for the wireless telecommunications traffic; and a base transceiver station operable to establish a communication session with the mobile station, the base station operable to identify a transport format combination indicator field in the wireless telecommunications traffic, the transport format combination indicator field operable to carry the class of service set by the mobile station.

2. The system of claim 1, wherein the mobile station provides the wireless telecommunications traffic in a radio frame.

3. The system of claim 1, wherein the base transceiver station is operable to encapsulate the wireless telecommunications traffic into one or more Internet Protocol packets, the base transceiver station operable to map the class of service set by the mobile station into a differentiated service code point field in header information of each Internet Protocol packet, the base transceiver station operable to route the wireless telecommunications traffic according to the class of service mapped into the differentiated services code point field.

4. A method for providing quality of service transport in a wireless telecommunications network, comprising:
establishing a communication session over a wireless telecommunications link;
receiving wireless telecommunications traffic during the communication session, the wireless telecommunications traffic including a class of service indication carried in a transport format combination indicator field;
mapping the wireless telecommunications traffic to routing channels according to the class of service indication in the transport format combination indicator field.

5. The method of claim 4, wherein the wireless telecommunications traffic is received in a radio frame.

6. The method of claim 4, wherein the class of service indication is inserted into the wireless telecommunications traffic by a mobile station, the wireless telecommunications traffic being received by a base transceiver station for mapping into routing channels of wired telecommunications network links.

7. A system for providing quality of service transport in a wireless telecommunications network, comprising:
means for establishing a communication session over a wireless telecommunications link;
means for receiving wireless telecommunications traffic during the communication session, the wireless telecommunications traffic including a class of service indication carried in a transport format combination indicator field; and
means for mapping the wireless telecommunications traffic to routing channels according to the class of service indication.

8. The system of claim 7, further comprising:
means for inserting the class of service indication into the wireless telecommunications traffic at an originator of the communication session;
means for sending the wireless telecommunications traffic.

9. The system of claim 8, wherein the means for sending the wireless telecommunications traffic includes means for sending the wireless telecommunications traffic as radio frames.

10. The system of claim 8, wherein the transport format combination indicator field is a two bit field specifying the class of service indication.

11. A system for providing quality of service transport in a wireless telecommunications network, comprising:
a base transceiver station operable to establish a communication session with a mobile station, the base transceiver station operable to receive wireless telecommunications traffic from the mobile station, the base transceiver station operable to determine a class of service for the wireless telecommunications traffic as set by the mobile station in a transport format combination indicator field, the base transceiver station operable to map the wireless telecommunications traffic onto appropriate routing channels according to the class of service indication for transport through a wired telecommunications network.

12. The system of claim 11, wherein the wireless telecommunications traffic is transported in radio frames.

13. The system of claim 12, wherein the base transceiver station is operable to encapsulate the radio frames into Internet Protocol packets.

14. The system of claim 13, wherein the base transceiver station is operable to map the class of service indication carried in the transport format combination indicator field of the radio frame into a differentiated services code point field in header information of each Internet Protocol packet.

15. The system of claim 14, wherein the base transceiver station is operable to forward the Internet Protocol packets to a base station controller over an Internet Protocol network according to the class of service indication in the differentiated services code point field.

16. The system of claim 11, wherein the transport format combination indicator field includes two bits to carry the class of service indication.

17. The system of claim 11, wherein the base transceiver station is operable to provide the class of service indication to the mobile station for insertion into the wireless telecommunications traffic.

18. A computer readable medium including code for providing quality of service transport in a wireless telecommunications network, the code operable to:
establish a communication session over a wireless telecommunications link;
receive wireless telecommunications traffic during the communication session, the wireless telecommunications traffic including a class of service indication carried in a transport format combination indicator field; and
map the wireless telecommunications traffic to routing channels according to the class of service indication.

19. The computer readable medium of claim 18, wherein the code is operable to receive the wireless telecommunications traffic as radio frames.

20. The computer readable medium of claim 18, wherein the class of service indication occupies two bits of the transport format combination field.

21. The computer readable medium of claim 18, wherein the code is operable to provide the class of service indication during the communication session for insertion into the wireless telecommunications traffic.

22. The computer readable medium of claim 18, wherein the code is operable to encapsulate the radio frames into Internet Protocol packets.

23. The computer readable medium of claim 22, wherein the code is operable to map the transport format combination indicator field into a differentiated service code point field in header information of the Internet Protocol packets.

* * * * *